(12) United States Patent
Baña Castro et al.

(10) Patent No.: US 10,960,915 B2
(45) Date of Patent: Mar. 30, 2021

(54) STEERING WHEEL SKELETON COVER, METHOD FOR PRODUCING SAME, AND STEERING WHEEL HAVING SUCH A STEERING WHEEL SKELETON COVER

(71) Applicant: DALPHI METAL ESPANA, S.A., Vigo (ES)

(72) Inventors: Ramon Baña Castro, Vigo (ES); Jorge Ollero Ollero, Vigo (ES); Marcelino Moure Fernández, Nigrán (ES); Pedro Pereiro Coto, Porrino (ES); Fabián Conde Bouza, Nigrán (ES)

(73) Assignee: DALPHI METAL ESPANA S.A., Vigo (ES)

( * ) Notice: Subject to any disclaimer, the term of this patent is extended or adjusted under 35 U.S.C. 154(b) by 7 days.

(21) Appl. No.: 16/467,198

(22) PCT Filed: Nov. 16, 2017

(86) PCT No.: PCT/EP2017/079372
§ 371 (c)(1),
(2) Date: Jun. 6, 2019

(87) PCT Pub. No.: WO2018/104014
PCT Pub. Date: Jun. 14, 2018

(65) Prior Publication Data
US 2020/0223471 A1    Jul. 16, 2020

(30) Foreign Application Priority Data

Dec. 7, 2016  (DE) ............... 10 2016 123 702.7

(51) Int. Cl.
*B62D 1/04*     (2006.01)
*B62D 1/06*     (2006.01)

(52) U.S. Cl.
CPC ............... *B62D 1/06* (2013.01); *B62D 1/04* (2013.01); *B62D 1/046* (2013.01)

(58) Field of Classification Search
CPC ............ B62D 1/04; B62D 1/046; B62D 1/06
See application file for complete search history.

(56) References Cited

U.S. PATENT DOCUMENTS

| 6,131,946 A * | 10/2000 | Castleman ............... B62D 1/04 280/731 |
| 6,508,485 B2 * | 1/2003 | Kikuta ................... B60Q 5/003 200/61.54 |

(Continued)

FOREIGN PATENT DOCUMENTS

| DE | 102009044662 A1 * | 3/2011 | ............... B62D 1/06 |
| EP | 2185398 B1 * | 10/2012 | ............. B60K 37/06 |

(Continued)

OTHER PUBLICATIONS

Machine translation of EP 2185398 B1 obtained on Aug. 5, 2020.*

*Primary Examiner* — Adam D Rogers
(74) *Attorney, Agent, or Firm* — Tarolli, Sundheim, Covell & Tummino LLP (57) ABSTRACT

The invention relates to a steering wheel armature cover (10) for mounting to a steering wheel armature (12) of a vehicle steering wheel (14), comprising a cover portion (16) for closing a profile of the steering wheel armature (12) open in cross-section as well as at least one securing element (18, 20, 22) for fixing the steering wheel armature cover (10) to the steering wheel armature (12). Furthermore, the invention also relates to a method of manufacturing a steering wheel armature cover (10) as well as to a vehicle steering wheel (14) comprising such steering wheel armature cover (10).

17 Claims, 5 Drawing Sheets

(56) References Cited

U.S. PATENT DOCUMENTS

| | | | |
|---|---|---|---|
| 8,171,820 B2* | 5/2012 | Song | B62D 1/046 |
| | | | 74/552 |
| 8,499,454 B2* | 8/2013 | Kurata | B62D 1/046 |
| | | | 29/894.1 |
| 10,683,027 B2* | 6/2020 | Zlatkov | B32B 37/1207 |
| 2008/0105077 A1* | 5/2008 | Laboskey | B62D 1/04 |
| | | | 74/558 |
| 2009/0007721 A1 | 1/2009 | Cortina et al. | |
| 2010/0218641 A1 | 9/2010 | Neumann et al. | |
| 2011/0048163 A1 | 3/2011 | Song | |
| 2012/0006148 A1 | 1/2012 | Nagata | |
| 2019/0367070 A1* | 12/2019 | Bana Castro | B62D 1/06 |
| 2020/0055535 A1* | 2/2020 | Bana Castro | B62D 1/08 |

FOREIGN PATENT DOCUMENTS

| | | | | |
|---|---|---|---|---|
| JP | 2001114112 | | 4/2001 | |
| JP | 2001114112 A | * | 4/2001 | |
| WO | WO-2009009029 A1 | * | 1/2009 | B62D 1/065 |

* cited by examiner

STEERING WHEEL SKELETON COVER, METHOD FOR PRODUCING SAME, AND STEERING WHEEL HAVING SUCH A STEERING WHEEL SKELETON COVER

RELATED APPLICATIONS

This application corresponds to PCT/EP2017/079392, filed Nov. 16, 2017, which claims the benefit of German Application No. 10 2016 123 702.7, filed Dec. 7, 2016, the subject matter of which are incorporated herein by reference in their entirety.

BACKGROUND OF THE INVENTION

The invention relates to a steering wheel armature cover, a method of manufacture thereof and a vehicle steering wheel comprising such steering wheel armature cover.

From prior art, numerous vehicle steering wheels comprising a hub and a steering wheel rim have been known already, the steering wheel rim being connected to the hub by at least one spoke. As a load-bearing core such steering wheels usually comprise a metal armature to which at least in portions a foam-coating is applied. This foam-coating then either forms a visible steering wheel surface or is used as a carrier for an optional heating mat as well as for lining elements, e.g. made from wood or leather.

SUMMARY OF THE INVENTION

It is the object of the invention to provide an as lightweight vehicle steering wheel as possible in which especially the material required for the foam-coating of the steering wheel armature is minimized.

In accordance with the invention, this object is achieved by a steering wheel armature cover for mounting on a steering wheel armature of a vehicle steering wheel comprising a cover portion for closing a profile of the steering wheel armature open in cross-section as well as at least one fastening element for fixing the steering wheel armature cover onto the steering wheel armature. The steering wheel armature cover thus closes the open profile of the steering wheel armature so that in total a closed hollow profile will form. In the cavity formed between the steering wheel armature and the steering wheel armature cover no material will penetrate during foam-coating so that with identical outer dimensions of the vehicle steering wheel less foaming material is required and thus the total steering wheel weight is decreased. The steering wheel armature cover preferably is a plastic component which at low weight can be manufactured in a simple and cost-efficient manner.

In one embodiment of the steering wheel armature cover, the cover portion has projections on the armature side for guiding and/or securing an electric line, with the projections especially preferred being integrally formed with the steering wheel armature cover. Thus, the electric line is accommodated to be protected in a cavity between the steering wheel armature and the steering wheel armature cover. For the rest, this is of advantage also in terms of manufacture, as during or after foam-coating no line channels have to be provided in the foaming material.

Preferably, the projections are configured as elastic clips for clip-connecting the electric line. In this way, the electric line can be fixed easily and quickly to the steering wheel armature cover.

According to another embodiment of the steering wheel armature cover, the cover section has a structured surface comprising especially protruding ribs on a side facing away from the steering wheel armature. Said ribs preferably extend in the longitudinal direction of a steering wheel rim and thus ensure an especially reliable and tight connection between the foam-coating and the steering wheel armature cover and, resp., the steering wheel armature. In the case of appropriate wear by the driver, the structured surface reliably prevents primarily undesired twisting of the foam-coating about the (curved) longitudinal axis of the steering wheel rim relative to the steering wheel armature cover and the steering wheel armature, respectively.

The cover portion of the steering wheel armature cover preferably includes a mounting projection for attaching an electrical operating unit of the vehicle steering wheel. The mounting projection especially comprises lateral guiding extensions for easy assembly and exact positioning of the operating unit.

Furthermore, an integrally formed plug connector for an electric connection to an electrical operating unit of the vehicle steering wheel may be provided on the steering wheel armature cover. The electrical operating unit may be connected by direct integration of the plug connector in the steering wheel armature cover as well as a complementary plug connector in the operating unit to an electric line secured or guided at the steering wheel armature cover with low manufacturing and mounting efforts.

Preferably, the at least one securing element of the steering wheel armature cover comprises a detent element for latching with the steering wheel armature and/or a friction-lock portion for frictional connection to the steering wheel armature and/or a securing opening for screwing or riveting to the steering wheel armature.

According to another embodiment, the steering wheel armature cover at least in portions has an L-shaped cross-section, wherein reinforcing ribs for stabilizing the steering wheel armature cover may be provided between the legs of the L-shaped cross-section.

For the rest, the object is also achieved by a steering wheel for a vehicle comprising a steering wheel axis, a hub for securing the steering wheel to a steering shaft rotatable about the steering wheel axis, and a steering wheel rim connected to the hub and at least partially surrounding the hub in the circumferential direction, a steering wheel armature which preferably at least in portions has an open cross-sectional profile and an afore described armature cover, wherein the steering wheel armature forms a hollow section closed in cross-section at least in portion together with the armature cover. The closed hollow profile is not filled with foaming material during foam-coating so that inside the vehicle steering wheel cavities are retained which result in reduced foaming material required and consequently in a lower weight of the steering wheel.

In one embodiment of the steering wheel, the armature cover is C-shaped in the axial top view and covers the steering wheel armature in the area of the steering wheel rim. Especially, the armature cover extends over at least 180°, especially at least 270°.

Further, there may be provided a foam-coating which at least in portions surrounds, especially encloses when viewed in cross-section, the steering wheel armature and the steering wheel armature cover.

Finally, the invention also relates to a method of manufacturing a vehicle steering wheel comprising the following steps of:

providing a steering wheel armature and an afore-described steering wheel armature cover;

securing an electric line to the steering wheel armature cover;

securing the steering wheel armature cover to the steering wheel armature so that the electric line is located at least in areas between the steering wheel armature cover and the steering wheel armature and a pre-assembled armature subassembly is formed;

foam-coating the pre-assembled armature subassembly.

In accordance with a method variant, after foam-coating an electrical operating unit is provided and is attached to a mounting projection of the steering wheel armature cover and/or of the steering wheel armature. Preferably, the operating unit is electrically connected during attachment and is fastened, especially latched on the mounting projection.

Further, after foam-coating at least in portions a lining, especially leather or wooden lining can be applied to the foam-coating.

BRIEF DESCRIPTION OF THE DRAWINGS

Further features and advantages of the invention will be resulting from the following description of a preferred embodiment with reference to the drawings, wherein.

DESCRIPTION

Figure 1:
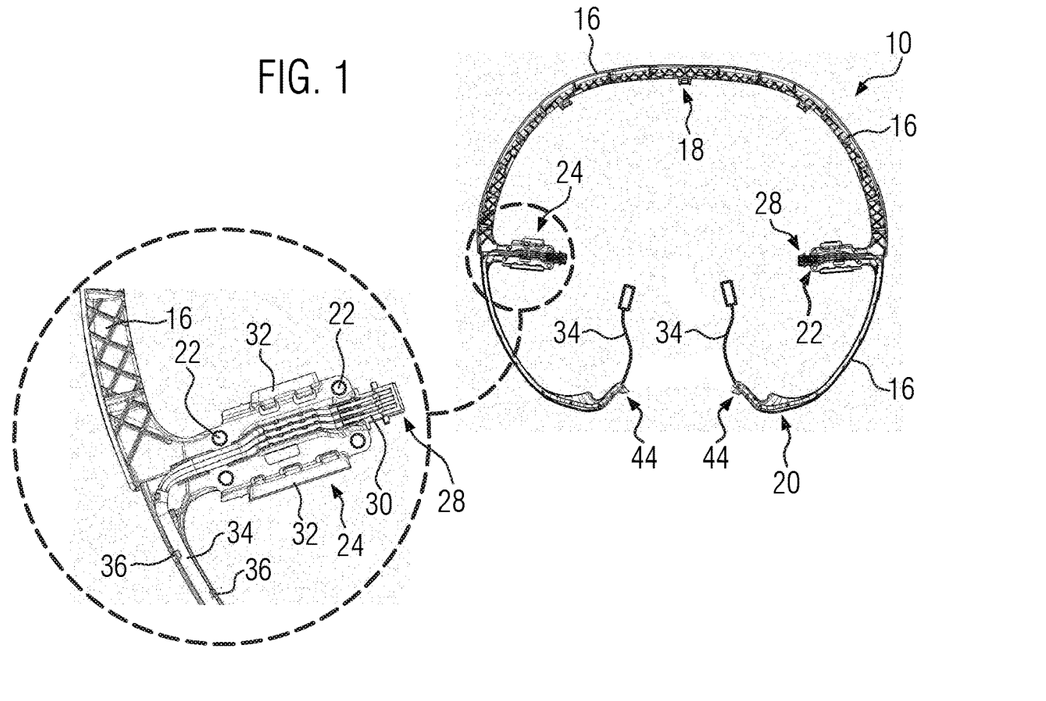
FIG. 1 shows a top view of a steering wheel armature cover according to the invention.

FIG. 1 illustrates a steering wheel armature cover 10 for mounting on a steering wheel armature 12 of a vehicle steering wheel 14 (cf. also FIG. 2) comprising a cover portion 16 for closing a profile of the steering wheel armature 12 open in cross-section (cf. also FIG. 9) as well as at least one securing element 18, 20, 22 for fixing the steering wheel armature cover 10 to the steering wheel armature 12.

The steering wheel armature cover 10 according to FIG. 1 is a substantially C-shaped plastic part, wherein in the shown embodiment with respect to the C-shape in each of an upper area and a lower area an inwardly protruding mounting projection 24 for attaching an electrical operating unit 26 (cf. FIG. 10) is integrally formed with the cover portion 16 of the steering wheel armature cover 10. The mounting projections 24 extend from the cover portion 16 to a free end 28.

In the detailed cutout from FIG. 1 it is moreover evident that the steering wheel armature cover 10 has an integrally formed plug connector 30 for electrical connection to the associated electrical operating unit 26 at the free end 28 of the mounting projection 24. Further, at the lateral edges of the mounting projection 25 guides 32, especially guide rails aligned in parallel to each other, are provided which interact with corresponding guide elements on the operating unit 26 and provide for quick assembly as well as exact alignment and positioning of the operating unit 26.

Starting from the plug connector 30, an electric line 34 extends over the mounting projection 24 to the cover portion 16 of the steering wheel armature cover 10. As indicated in the detailed cutout from FIG. 1, the cover portion 16 includes projections 36 on the armature side for guiding and/or securing the electric line 34, wherein said projections 36 extend approximately normal to a plane spanned by the largely C-shaped steering wheel armature cover 10.

The projections 36 in the shown embodiment are integrally formed with the cover portion 16 and are designed as clips, especially elastic clips for clip-connecting the electric line 34.

Figure 2:
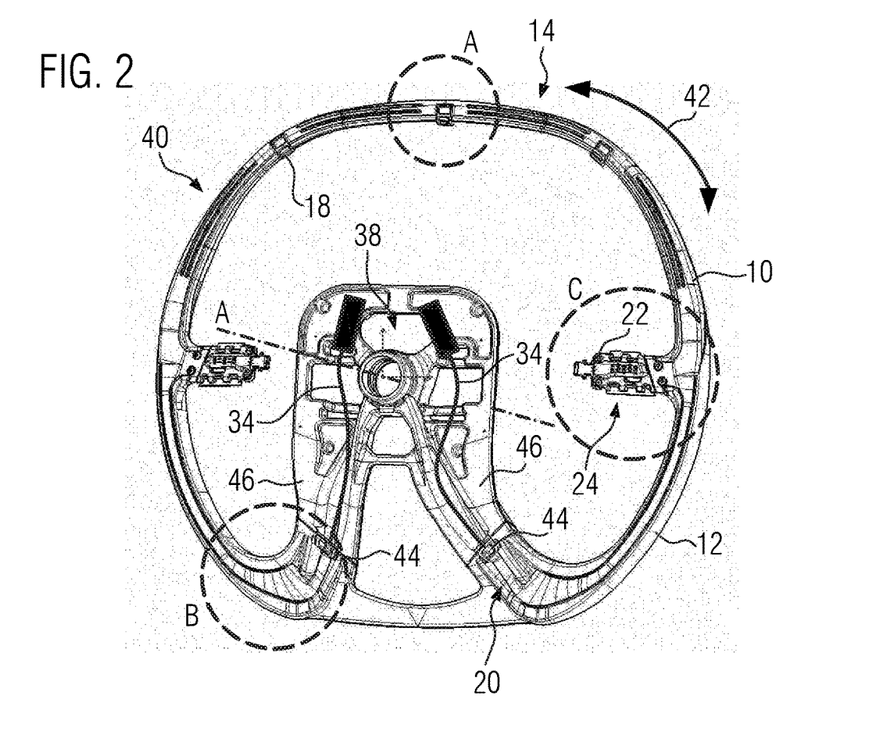
FIG. 2 shows a rear view of a steering wheel according to the invention comprising a steering wheel armature and a mounted steering wheel armature cover according to FIG. 1.

FIG. 2 illustrates a rear view of a steering wheel 14 for a vehicle, comprising a steering wheel axis A, a hub 38 for securing the steering wheel 14 to a steering shaft rotatable about the steering wheel axis A, a steering wheel rim 40 connected to the hub 38 and surrounding the hub 38 at least partially in the circumferential direction 42. Moreover, the steering wheel 14 comprises the steering wheel armature 12 which at least in portions has an open cross-sectional profile and at least partially forms the hub 38 and the steering wheel rim 40, as well as the afore-described steering wheel armature cover 10, wherein the steering wheel armature 12 together with the steering wheel armature cover 10 at least in portions forms a hollow profile closed in cross-section.

As already afore-mentioned, the steering wheel armature cover 10 is approximately C-shaped in an axial top view (except for the optional protruding mounting projections 24) and covers the steering wheel armature 12 in the area of the steering wheel rim 40. The steering wheel armature cover 10 extends between its free ends 44 over at least 180°, especially at least 270° about the steering wheel axis A, with the free ends 44 being preferably arranged in the area of steering wheel spokes or connecting elements 46 connecting the steering wheel rim 40 to the hub 38. The electric line 34 then can be connected, for example, via said connecting elements 46 to a buffer spring in the area of the hub 38 and, in this way, can be coupled to a power supply and/or electric control unit of the vehicle.

In FIGS. 3 to 6 detailed cutouts from FIG. 2 are shown in the area of securing elements 18, 20, 22 of the steering wheel armature cover 10.

Figure 3:
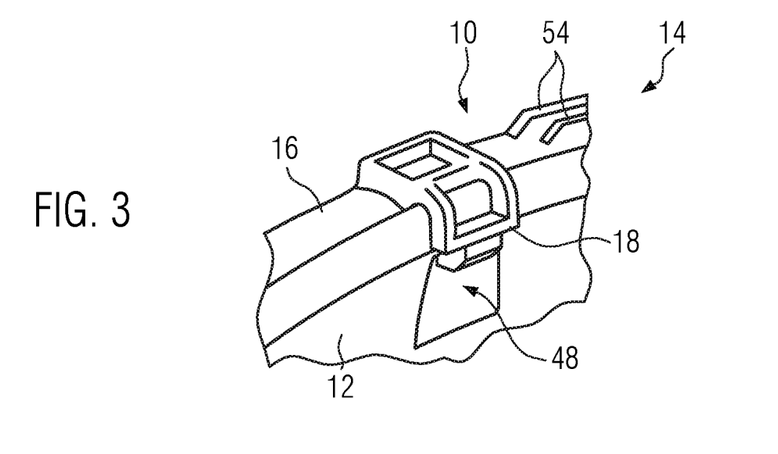
FIG. 3 shows a detailed cutout A from FIG. 2 in the area of a securing element.

FIG. 3, for example, shows a securing element 18 in the form of a detent element for latching with the steering wheel armature 12. The detent element is an elastic detent hook engaging in a detent recess 48 of the steering wheel armature 12 and securing the steering wheel armature cover 10 to the steering wheel armature 12. In an axial top view the securing elements 18 in the form of detent elements are provided in a home position of the vehicle steering wheel 14 for straight-ahead driving in an upper area, i.e. between a 9 o'clock position and a 3 o'clock position, preferably between a 10 o'clock position and a 2 o'clock position.

Figure 4:
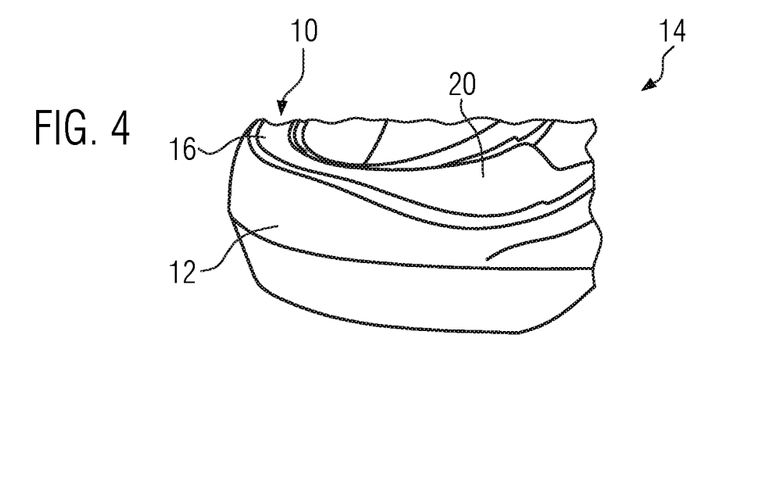
FIG. 4 shows a detailed cutout B from FIG. 2 in the area of another securing element.

FIG. 4 shows a securing element 20 designed as friction-locking portion for the frictional connection to the steering wheel armature 12. Such friction-locking portions are provided especially in the area of the free ends 44 of the steering wheel armature cover 10 and form a press-fit with the steering wheel armature 12 so that in total a closed hollow cross-section will form. In some configuration variants, the free ends 44 of the steering wheel armature cover 10 may be friction-locking plugs which prevent foaming material from penetrating the closed hollow cross-section during foam-coating of the steering wheel armature 12 and the steering wheel armature cover 10.

Figure 5:
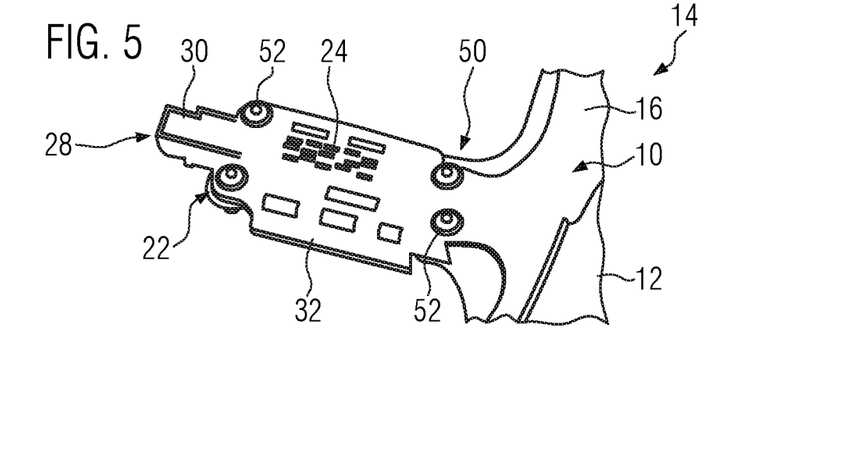
FIG. 5 shows a detailed cutout C from FIG. 2 in the area of another securing element.

FIG. 5 illustrates a securing element 22 designed as securing opening for screwing or riveting with the steering wheel armature 12. This especially stable fastening of the steering wheel armature cover 10 to the steering wheel armature 12 is provided, according to FIGS. 2 and 5, in the area of the mounting projections 24 which in the home position of the vehicle steering wheel 14 for straight-ahead driving in the axial top view are preferably arranged approximately in a 9 o'clock position and a 3 o'clock position. In the area of each mounting projection 24, the steering wheel armature 12 includes an armature projection 50 in which equally securing openings are provided so that in the present configuration the steering wheel armature cover 10 can be tightly connected to the steering wheel armature 12 via screws 52.

Figure 6:
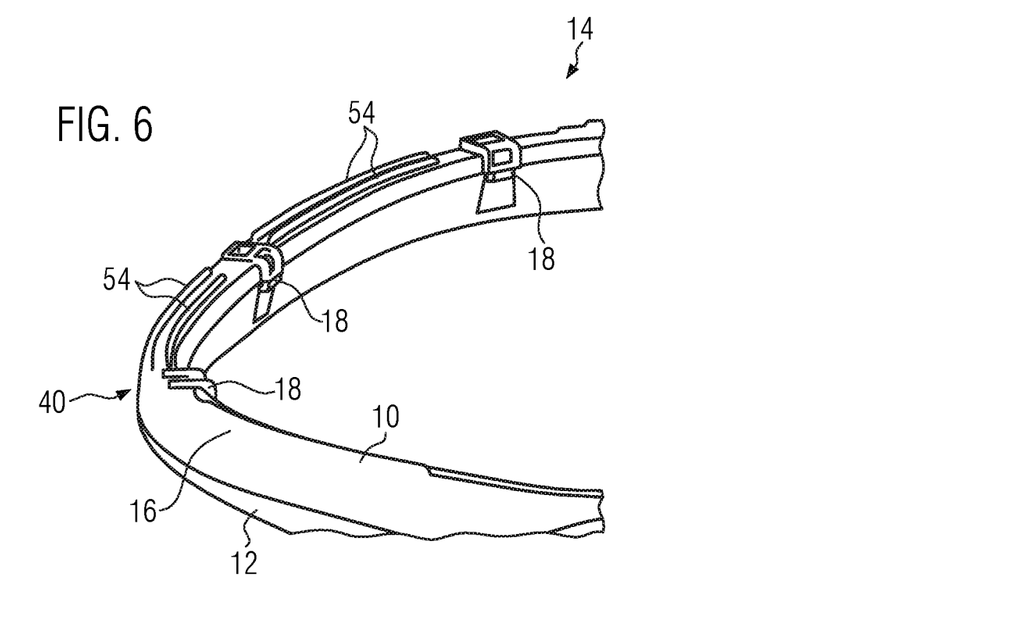
FIG. 6 shows another detailed cutout from FIG. 2.
Figure 9:
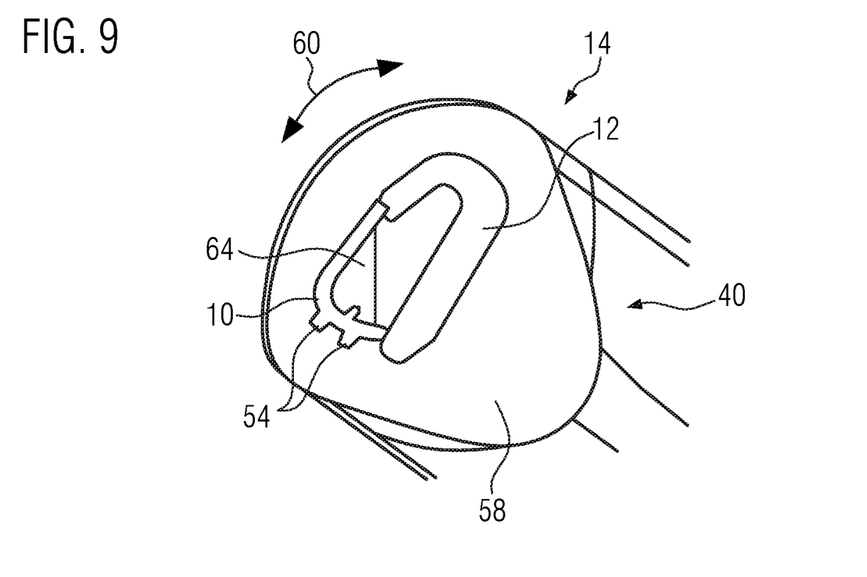
FIG. 9 shows a section IX-IX across the steering wheel according to FIG. 8.

FIG. 6 illustrates a portion of the steering wheel armature cover 10 secured to the steering wheel armature 12, the cover portion 16 including on an outer side facing away from the steering wheel armature 12 a structured surface which comprises especially outwardly protruding ribs 54 (cf. also FIG. 9). The ribs 54 extend especially in the circumferential direction 42, i.e. in the longitudinal direction of the steering wheel rim 40. Furthermore, the ribs 54 are located, relative to the mounted state of the vehicle steering wheel 14, on a rear side, i.e. on a side of the vehicle steering wheel 14 facing away from the driver.

The structured surface on the outside of the steering wheel armature cover 10 secured to the steering wheel armature 12 is provided, in a home position of the vehicle steering wheel 14 for straight-ahead driving, in the axial top view preferably in an upper portion between a 9 o'clock position and a 3 o'clock position. Alternatively or additionally, however, also in other areas of the steering wheel armature cover 10 such structured surface may be provided in the form of protruding ribs 54 or the like.

Figure 7:
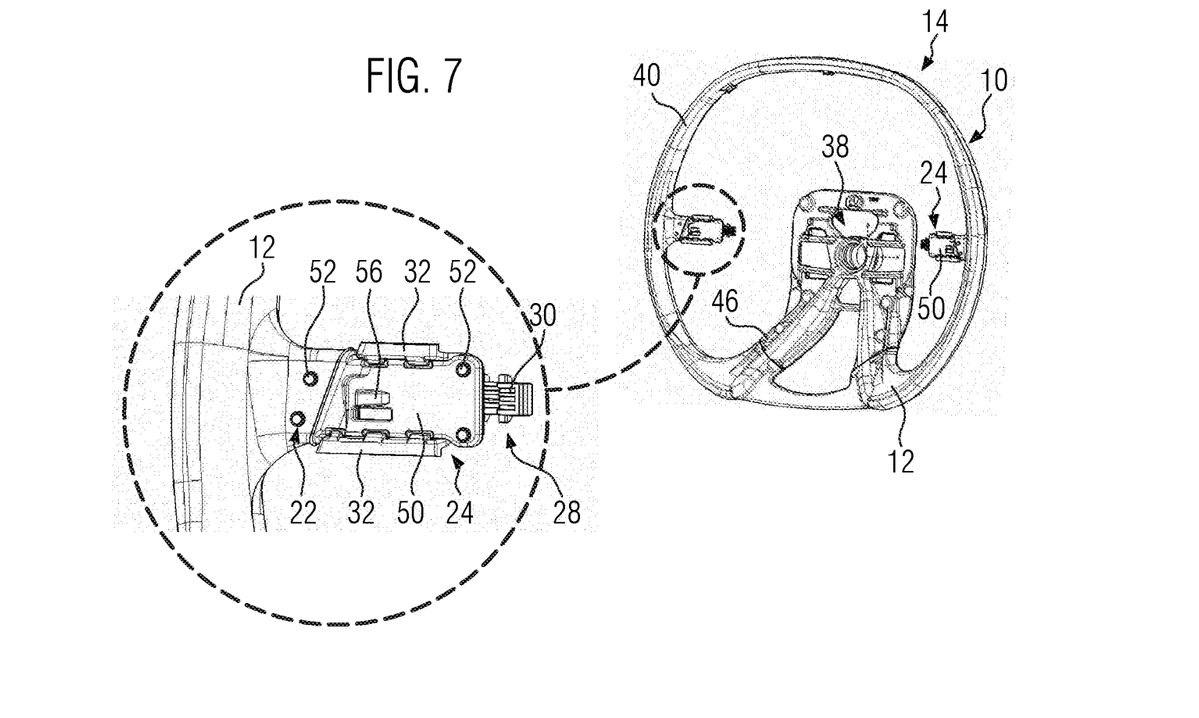
FIG. 7 shows a front view of the steering wheel according to the invention in compliance with FIG. 2.

FIG. 7 shows a front view of the vehicle steering wheel 14 from FIG. 2 and once again illustrates the fastening between the steering wheel armature cover 10 and the steering wheel armature 12 in the area of a mounting and armature projection 24, 50. Apart from the screwed connection by means of screws 52, the mounting projection 24 according to the detailed cutout from FIG. 7 encompasses the armature projection 50 by means of detent extensions so that a detent connection is formed. In the present embodiment, concretely the guides 32 for the electrical operating unit 25 are configured as detent extensions.

Further, on the armature projection 50 a detent catch 56 for latching the electrical operating unit 26 is provided. Such detent catch 56 may be provided alternatively or additionally also on the mounting projection 24 of the steering wheel armature cover 10.

Figure 8:
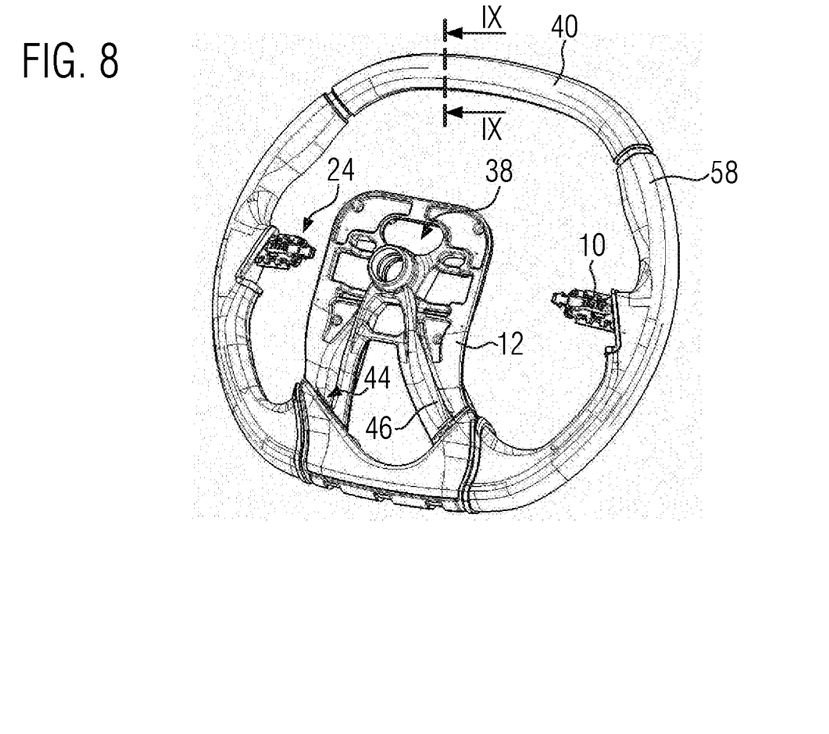
FIG. 8 shows a rear view of the steering wheel according to the invention in compliance with FIG. 2.

Just as FIG. 2, FIG. 8 illustrates a rear view of the steering wheel 14, with a foam-coating 58 being applied which at least in portions surrounds the steering wheel armature 12 and the steering wheel armature cover 10.

FIG. 9 shows a section IX-IX across the steering wheel 14 according to FIG. 8 and illustrates that in cross-section the foam-coating 58 completely encloses the steering wheel armature 12 and the steering wheel armature cover 10.

For the rest, in FIG. 9 also the ribs 54 of the structured surface of the steering wheel armature cover 10 are shown. The ribs 54 ensure better bonding of the steering wheel armature cover 10 and, resp., the steering wheel armature 12 to the foam-coating 58 and form an anti-twist protection in the case of twisting strain 60 of the foam-coating 58 about the longitudinal direction of the steering wheel rim 40.

In accordance with FIG. 9, the steering wheel armature cover 10 at least in portions has an L-shaped cross-section which, together with the open, for example L-shaped or U-shaped cross-section of the steering wheel armature 12, forms a hollow profile closed in cross-section. In this way, inside the steering wheel 14 a cavity 62 is formed which is not filled by foaming material during foam-coating. As a consequence, less foam material is required so that the weight of the steering wheel 14 is advantageously reduced. In addition, the electric line 34 can be accommodated at least in portions in the cavity 62. Damage of the electric line 34 is largely excluded due to the protected position thereof. Furthermore, no later complicated finishing of the foam-coating is required to lay and secure the electric line.

As indicated in FIG. 9, between the legs of the L-shaped cross-section of the steering wheel armature cover 10 reinforcing ribs 64 spaced in the longitudinal direction of the steering wheel rim 40 may be provided so as to increase the stability of the steering wheel armature cover 10.

Figure 10:
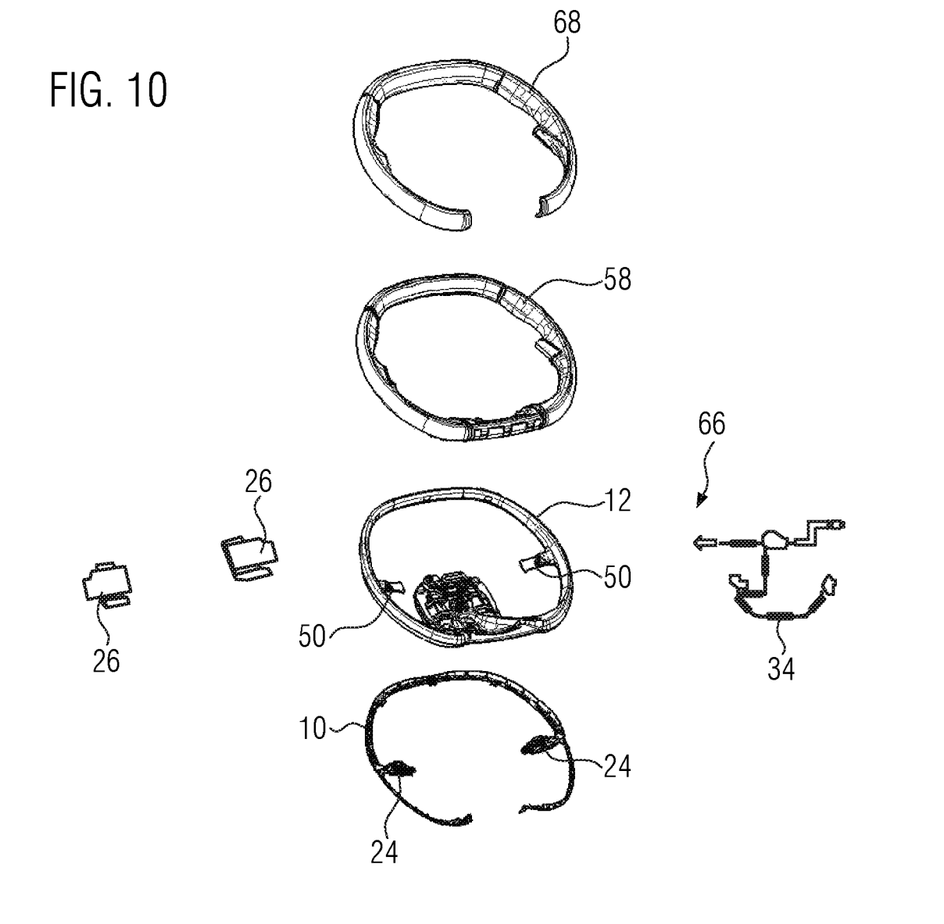
FIG. 10 shows an exploded view of a steering wheel according to the invention.

Hereinafter, a method of manufacturing the vehicle steering wheel 14 is described by way of FIG. 10.

In this manufacturing method at first the steering wheel armature 12 and the steering wheel armature cover 10 are provided, with the steering wheel armature 12 being preferably manufactured as an injection-molded part from a magnesium alloy or aluminum alloy.

In the next method step, the electric line 34 is secured to the steering wheel armature cover 10 and then the steering wheel armature cover 10 is secured along with the line 34 to the steering wheel armature 12 so that the electric line 34 is located at least in portions between the steering wheel armature cover 10 and the steering wheel armature 12. In this way, a pre-assembled armature subassembly 66 is formed which comprises the steering wheel armature 12, the steering wheel armature cover 10 and the electric line 34.

Said pre-assembled armature subassembly 66 is foam-coated in a further method step, for example by foam material of polyurethane.

After foam-coating of the armature subassembly 66 optionally at least in portions a lining 68, especially leather or wooden lining, is applied to the foam-coating 58.

Moreover, after foam-coating an electrical operating unit 26 can be provided and attached to the mounting projection 24. When it is attached to the mounting projection 24, the operating unit 26 is electrically connected via the plug connector 30 and moreover is secured, especially latched, to the mounting projection 24 and/or to the armature projection 50.

The operating unit 26 is, for example, a possibly illuminated multi-functional switch subassembly and is preferably attached to the mounting projection 24 after the lining 68 has been applied. Ideally the operating unit 26 thus can be easily replaced at any time in the case of defect or a desired change of function.

The invention claimed is:

1. A steering wheel armature cover for mounting to a steering wheel armature (12) of a vehicle steering wheel (14), comprising:
   a cover portion (16) for closing a profile of the steering wheel armature (12) open in cross-section about a circumferential direction (42), the cover portion (16) having an open cross-section about the circumferential direction (42) and abutting the steering wheel armature (12) to close the open cross-sections and define a cavity (62) between the cover portion (16) and the steering wheel armature (12), and at least one securing element (18, 20, 22) for fixing the steering wheel armature cover (10) to the steering wheel armature (12).

2. The steering wheel armature cover according to claim 1, wherein the cover portion (16) includes projections (36) on an armature side for guiding and/or securing an electric line (34).

3. The steering wheel armature cover according to claim 2, wherein the projections (36) are in the form of elastic clips for clip connecting the electric line (34) to the core portion (16).

4. The steering wheel armature cover according to claim 1, wherein the cover portion (16) has protruding ribs (54) on a side facing away from the steering wheel armature (12).

5. The steering wheel armature cover according to claim 1, wherein the cover portion (16) includes a mounting projection (24) for attaching an electrical operating unit (26) of the vehicle steering wheel (14).

6. The steering wheel armature cover according to claim 1, wherein an integrally formed plug connector (30) is provided for electrical connection to an electrical operating unit (26) of the vehicle steering wheel (14).

7. The steering wheel armature cover according to claim 1, wherein the at least one securing element (18, 20, 22) comprises a detent element for latching to the steering wheel armature (12) and/or a friction-locking portion for frictional connection to the steering wheel armature (12) and/or a securing opening for screwing or riveting to the steering wheel armature (12).

8. The steering wheel armature cover according to claim 1, wherein the steering wheel armature cover (10) at least in portions has an L-shaped cross-section.

9. The steering wheel armature cover according to claim 1, wherein the cover portion includes a pair of legs for engaging respective legs of the steering wheel armature for closing the open cross-sections.

10. The steering wheel armature cover according to claim 1, wherein the steering wheel armature cover is L-shaped.

11. A steering wheel for a vehicle, comprising:
a steering wheel axis (A),
a hub (38) for securing the steering wheel (14) to a steering shaft rotatable about the steering wheel axis (A),
a steering wheel rim (40) which is connected to the hub (38) and at least partially surrounds the hub (38) in the circumferential direction (42),
the steering wheel armature (12) and
the steering wheel armature cover (10) according claim 1.

12. The steering wheel according to claim 11, wherein the steering wheel armature cover (10) in the axial top view is C-shaped and covers the steering wheel armature (12) in an area of the steering wheel rim (40).

13. The steering wheel according to claim 11, wherein a foam-coating (58) is provided which at least in portions surrounds the steering wheel armature (12) and the steering wheel armature cover (10).

14. A method of manufacturing a vehicle steering wheel comprising the following steps of:
providing the steering wheel armature (12) and the steering wheel armature cover (10) according to claim 1;
securing an electric line (34) to the steering wheel armature cover (10);
securing the steering wheel armature cover (10) to the steering wheel armature (12) so that the electric line (34) at least in portions is located between the steering wheel armature cover (10) and the steering wheel armature (12) and a subassembly (66) is formed;
foam-coating the subassembly (66).

15. The method according to claim 14, wherein after foam-coating an electrical operating unit (26) is provided and is attached to a mounting projection (24).

16. The method according to claim 14, wherein after foam-coating a lining (68) is applied to the foam-coating (58).

17. The method according to claim 16, wherein the lining comprises one of a leather or wooden lining.

* * * * *